United States Patent Office 3,248,940
Patented May 3, 1966

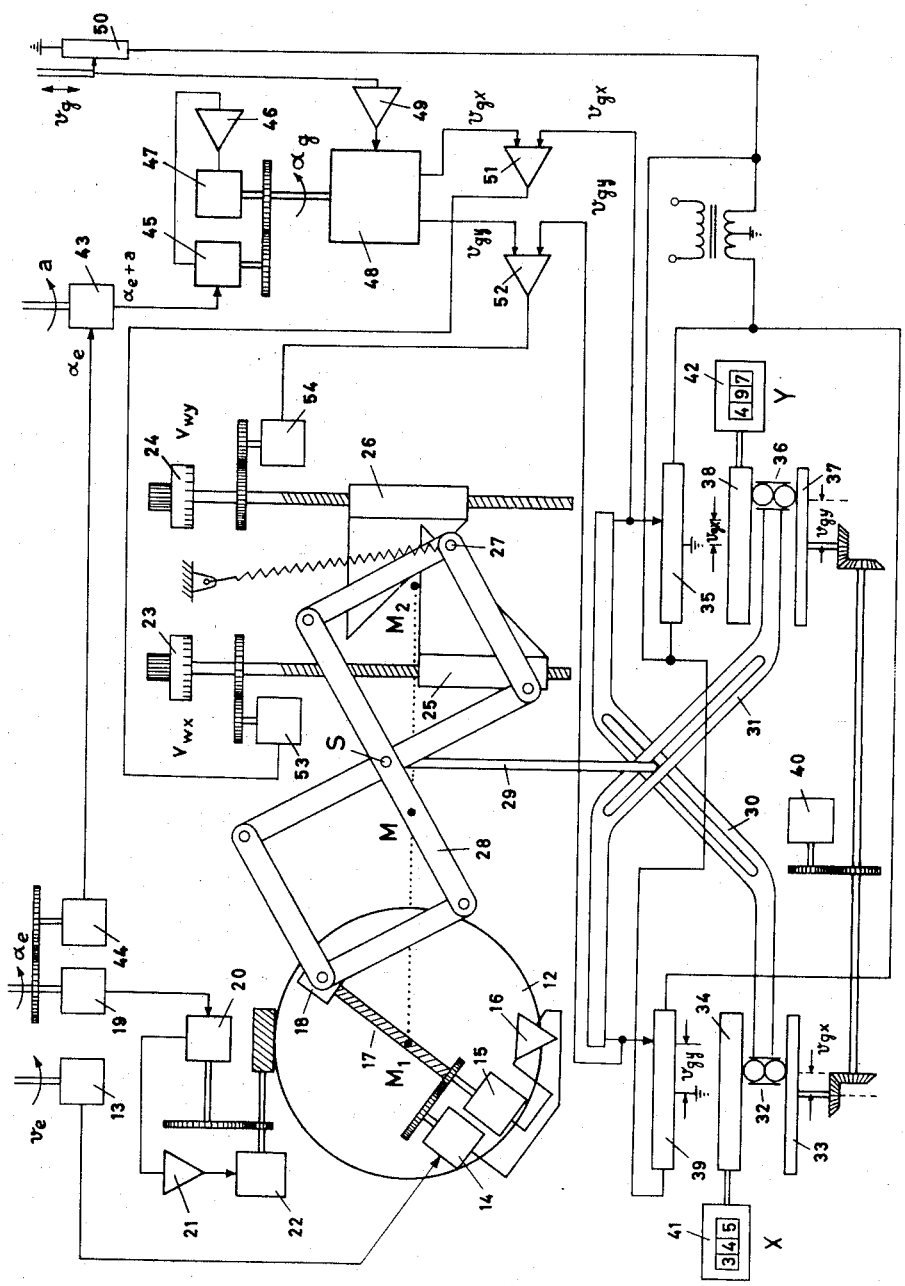

3,248,940
DEVICE FOR DETERMINING WIND VELOCITY
Karl Heinrich Ramsayer, 54 Hasenbergstrasse,
Stuttgart, Germany
Original application Apr. 29, 1959, Ser. No. 809,860.
Divided and this application Jan. 4, 1965, Ser. No. 453,853
Claims priority, application Germany, May 12, 1958, R 23,309
3 Claims. (Cl. 73—178)

This is a division of application Serial No. 809,860, filed April 29, 1959, now abandoned.

Advanced self-contained navigational equipments of aircraft such as Doppler navigation systems or inertial navigation systems are often combined with a dead reckoning computer. The purpose of this combination is that in the case of inoperativeness of the Doppler equipment or in the case of failure of the Doppler or inertial equipment the position of the aircraft may be calculated by a continuous integration of the ground speed vector as computed from the true airspeed vector and from the wind speed vector. For this dead reckoning computer it is especially important to know the true wind the moment when the Doppler or inertial equipment gets inoperative. Therefore, automatic wind computers were developed which compute the wind speed and wind direction of the quantity and the direction of the true airspeed, the drift angle and the ground speed.

The object of the present invention comprises a new device for automatic wind finding by comparing the measured ground speed vector with the measured airspeed vector. It is so designed that there is no difficulty in replacing this device with a device for automatic wind finding which compares the position which is derived from the measured airspeed vector and an assumed wind vector with the true position which is described in United States patent application 809,860, now apandoned but of which this application is a continuation, or with the position derived from VORTAC or TACAN according to U.S. Patent 3,082,420. It is also easily possible to combine two or all three methods for automatic wind finding. The invention is therefore especially suitable as a part of an integrated navigation system which combines different navigational aids to get an optimal use of them. This is an essential advantage which in the available wind computers is not existing. A further advantage is that the invention is simpler than the known solutions.

The principle of the invention is the following: The dead reckoning computer calculates from true airspeed, heading and two rectangular components of the wind speed vector, two rectangular components of ground speed which are parallel to the coordinate system for the navigation. These calculated ground speed components are compared with the components of ground speed derived from a Dopple or inertial navigational system. If there are any differences between the corresponding ground speed components the corresponding components of wind speed are changed automatically in such a way, that the calculated ground speed components are equat to the measured ground speed components.

The drawing, in a schematical representation, shows an embodiment of the invention a chiefly mechanically operated dead reckoning computer.

In this dead reckoning computer the true airspeed is set as a vector in accordance with the amount $v_e$ and in accordance with the direction $\alpha_e$ in the vector mechanism 12. The true airspeed is set by a synchro remote transmission system consisting of the synchro transmitter 13 which is built into the true airspeed transmitter, of the synchro control transformer 14, of the servomotor 15 and of the amplifier 16, whereby the screw nut 18 arranged on the spindle 17 is readjusted by the servomotor 15 relatively to the centre point $M_1$ of the vector mechanism in accordance with $v_e$.

The grid heading $\alpha_e$ is likewise set by a synchro remote transmission system. This system consists of the synchro transmitter 19 which is operated by a compass system, of the synchro control transformer 20, of the amplifier 21 and of the servomotor 22. The servomotor 22 is adapted to turn the vector mechanism 12 via a worm gear until it is aligned in accordance with $\alpha_e$.

With the aid of the setting knobs 23 and 24 the wind can be set in accordance with its components $v_{wx}$ and $v_{wy}$ by hand in parallel with the x- and y-axis respectively, of the coordinate grid used as the system of reference. On account of this the pin 27, resting against the sliders 25 and 26 by spring action, is displaced in relation to the centre point $M_2$ of the wind-setting device according to $v_{wx}$ and $v_{wy}$. Both the true airspeed vector and the wind vector are vectorially added by the shears 28, the ends of which are hingedly connected with the screw nut 18 (point of the vector $v_e$), as well as with the pin 27 (point of the wind vector). The vector sum corresponding to the ground speed $v_g$ is represented by the distance MS, wherein S corresponds to the centre point of the shears and M to the centre between $M_1$ and $M_2$.

The ground speed vector $MS = v_g$ is resolved via the rod 29 and the two sliders 30 and 31 rectangularly crossing each other, into the components $v_{gx}$ and $v_{gy}$ parallel in relation to the x- or y-axis of the reference coordinate system respectively. For reasons of simplicity and for enabling a better understanding both the sliders 30 and 31, as well as the shears 28 are shown in a staggered representation. In reality both the sliders and the shears are lying in parallel horizontal planes, and the rod 29 is positioned vertically in relation to the plane of the shears and the sliders. By the slider 30 the ball cage 32 of the ball and disc integrator 32, 33, 34, as well as the linear potentiometer 35 are readjusted in accordance with $v_{gx}$. By the slider 31 the ball cage 36 of the ball and disc integrator 36, 37, 38, as well as the linear potentiometer 39 are readjusted in accordance with $v_{gy}$. When the discs 33 and 37 are driven by the motor 40 with a constant speed, then the friction roller 34 will rotate an amount proportional to the flight path in the x-direction, and the friction roller 38 will rotate an amount proportional to the flight path in the y-direction. To the friction rollers 34 and 38 there are connected the counters 41 and 42 which, after having previously been set to the coordinates of the starting point of flight, continuously indicate the map grid coordinates x and y relating to the aircraft position.

The Doppler navigation system can be caused to act upon the dead reckoning computer in the following way: The differential synchro 43 is connected with the synchro transmitter 44 which is set by the compass system according to $\alpha_e$. The shaft of this differential synchro 43 is turned by the Doppler aerial unit in accordance with the drift angle $a$. On account of this the follow-up system connected to the output of 43 and consisting of the synchro control transformer 45, of the amplifier 46 and of the servomotor 47, will rotate the shaft of the resolver 48 in accordance with the track $$\alpha_g = \alpha_e + a$$

Furthermore, the resolver 48 is connected via the buffer amplifier 49 to the potentiometer 50, which is readjusted by the Doppler radar system in accordance with the ground speed $v_g$. Consequently, the output voltages of the resolver 48 are proportional to $$v_{gx} = v_g \cdot \cos \alpha_g \text{ and } v_{gy} = v_g \cdot \sin \alpha_g.$$

Via the amplifiers 51 and 52 these output voltages are continuously compared with the voltages as tapped from the linear potentiometers 35 and 39. The supply voltages of the potentiometers 35, 39 and 50 must be chosen thus that the same speed components correspond to same output voltages. In case of any probable differences the potentiometers 35 and 39 are adjusted to the output voltages of the resolver with the aid of the servomotors 53 and 54 by correcting the wind components $v_{wx}$ and $v_{wy}$.

Instead of a Doppler radar system there may also be used an inertial navigation system in which the ground speed is calculated by measuring and integrating the horizontal accelerations.

This methods of combining the dead reckoning computer with the ground speed transmitter by means of the wind-correcting device designed in accordance with the invention bears the advantage over the sole employment of the directly measured ground speed that in the event of a failure of the ground speed transmitter the indication of the dead reckoning computer is continued on account of the exact calculated last wind data.

The invention may also be used for the dead reckoning navigation of marine vessels. In this case we have to measure the speed of the vessel relative to the water instead of the airspeed. We get then the velocity of the flow of the water instead of the wind. To meet both possibilities in the following claims we say vehicle for aircraft or vessel and medium for air or water and velocity of the medium for wind or velocity of the flow of the water.

While the principles of the invention have been described above in connection with a specific embodiment, and particular modifications thereof, it is to be clearly understood that this description is made only by way of example and not as a limitation on the scope of the invention as set forth in the objects thereof and in the accompanying claims.

What is claimed is:

1. A device for determining the velocity of the medium for the automatic navigation of vehicles moving in said medium by way of dead reckoning comprising an automatic dead reckoning computer which calculates the position of the vehicle from the measured quantity and direction of the vehicle's speed relative to the medium and from the velocity of the medium as set in accordance with two rectangular components, elements for the setting of said rectangular components of the velocity of the medium, means for analogue computing two rectangular components of the ground speed of the vehicle from said speed relative to the medium and said velocity of the medium, a Doppler navigation system measuring the ground speed and the drift of the vehicle, means to resolve the ground speed measured by said Doppler navigation system in two rectangular components parallel to said ground speed components of the dead reckoning computer, means to compare said ground speed components determined by the dead reckoning computer and said ground speed components determined by the Doppler navigation system and means for the automatical setting of said elements for setting the components of the velocity of the medium in the dead reckoning computer in such a way that the ground speed components of the dead reckoning computer are equal to the ground speed components of the Doppler navigation system.

2. A device for determining the velocity of the medium for the automatic navigation of vehicles moving in said medium by way of dead reckoning comprising an automatic dead reckoning computer which calculates the position of the vehicle from the measured quantity and direction of the vehicle's speed relative to the medium and from the velocity of the medium as set in accordance with two rectangular components, elements for the setting of said rectangular components of the velocity of the medium, means for analogue computing two rectangular components of the ground speed of the vehicle from said speed relative to the medium and said velocity of the medium, a Doppler navigation system measuring two components of the ground speed of the vehicle, means to transform the ground speed components measured by said Doppler navigation system in two rectangular components parallel to said ground speed components of the dead reckoning computer, means to compare said ground speed components determined by the dead reckoning computer and said transformed ground speed components determined by the Doppler navigation system and means for the automatical setting of said elements for setting the components of the velocity of the medium in the dead reckoning computer in such a way that the ground speed components of the dead reckoning computer are equal to the transformed ground speed components of the Doppler navigation system.

3. A device for determining the velocity of the medium for the automatic navigation of vehicles moving in said medium by way of dead reckoning comprising an automatic dead reckoning computer which calculates the position of the vehicle from the measured quantity and direction of the vehicle's speed relative to the medium and from the velocity of the medium as set in accordance with two rectangular components, elements for the setting of said rectangular components of the velocity of the medium, means for analogue computing two rectangular components of the ground speed of the vehicle from said speed relative to the medium and said velocity of the medium, an inertial navigation system with means to determine two rectangular components of the ground speed of the vehicle parallel to said ground speed components of the dead reckoning computer, means to compare said ground speed components determined by the dead reckoning computer and said ground speed components determined by the inertial navigation system and means for the automatical setting of said elements for setting the components of the velocity of the medium in the dead reckoning computer in such a way that the ground speed components of the dead reckoning computer are equal to the ground speed components determined by the inertial navigation system.

References Cited by the Examiner

UNITED STATES PATENTS

| | | | |
|---|---|---|---|
| 2,847,855 | 8/1958 | Berger | 73—178 |
| 2,936,950 | 5/1960 | Parsons | 235—61 |
| 3,007,338 | 11/1961 | Gray et al. | 73—178 |

ISAAC LISANN, *Primary Examiner.*

SAMUEL S. MATTHEWS, *Examiner.*